W. WRIGHT.
COMBINED TYPE WRITING AND COMPUTING MACHINE.
APPLICATION FILED JAN. 20, 1912. RENEWED OCT. 26, 1917.
1,266,188.
Patented May 14, 1918.
2 SHEETS—SHEET 1.
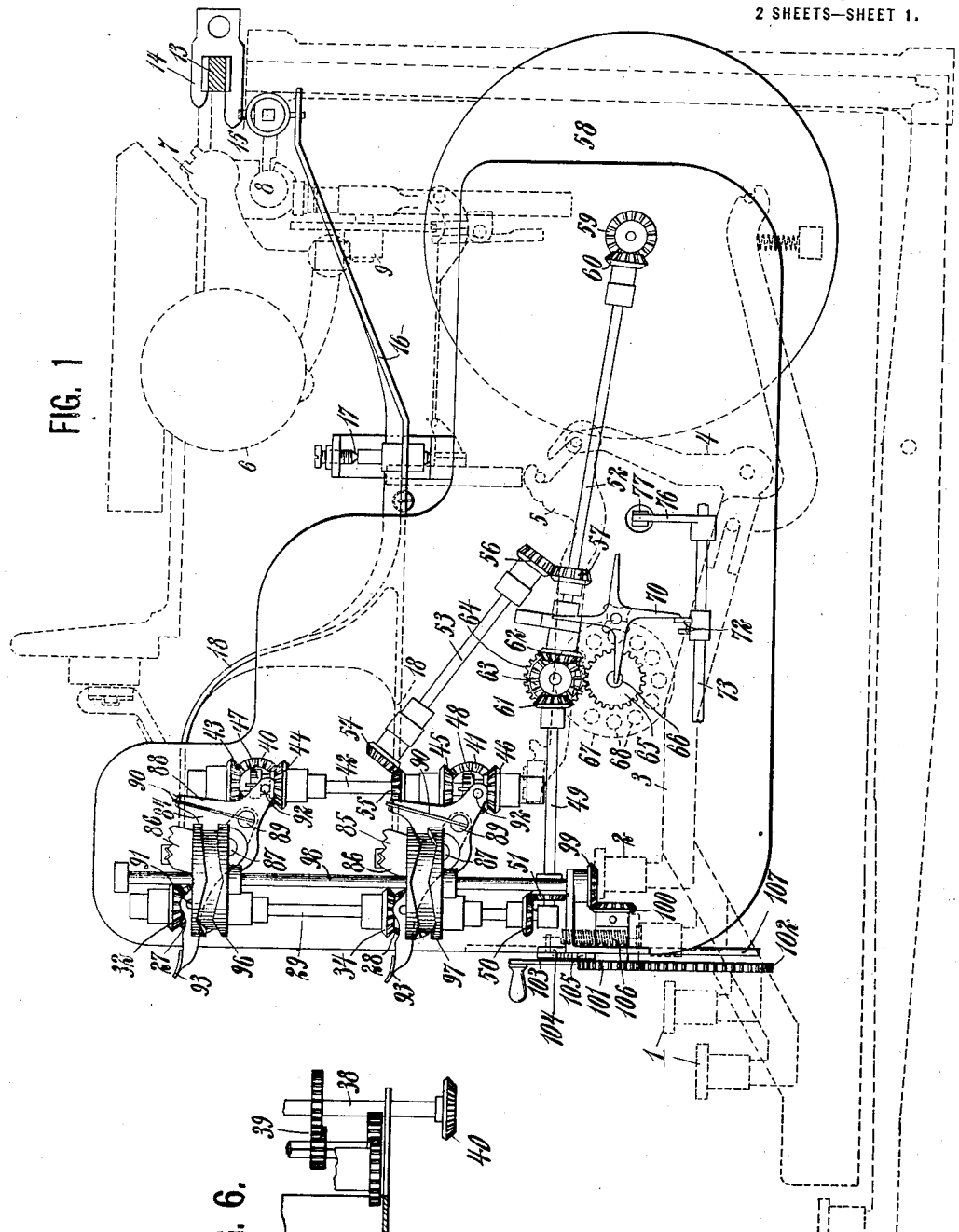
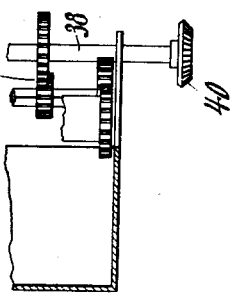
WITNESSES:
F. D. Sweet.
Titus H. Irons.
INVENTOR:
Walter Wright
BY
D. C. Stickney
ATTORNEY W. WRIGHT.
COMBINED TYPE WRITING AND COMPUTING MACHINE.
APPLICATION FILED JAN. 20, 1912. RENEWED OCT. 26, 1917.
1,266,188.
Patented May 14, 1918.
2 SHEETS—SHEET 2.
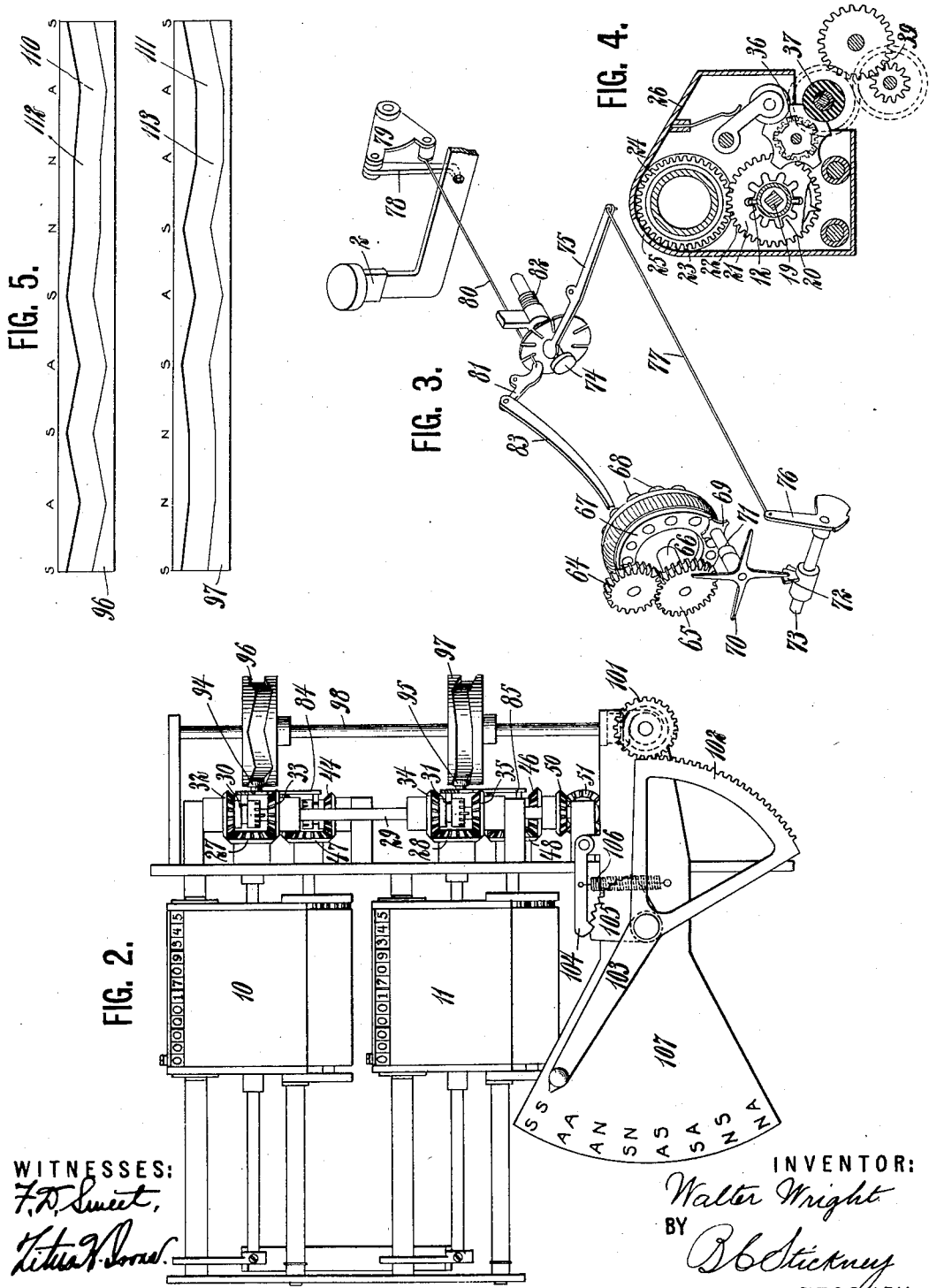

UNITED STATES PATENT OFFICE.

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,266,188.        Specification of Letters Patent.     Patented May 14, 1918.

Application filed January 20, 1912, Serial No. 672,350. Renewed October 26, 1917. Serial No. 198,637.

*To all whom it may concern:*

Be it known that I, WALTER WRIGHT, a citizen of the United States, residing in New York city, in the county of New York and State of New York, have invented certain new and useful Improvements in Combined Type-Writing and Computing Machines, of which the following is a specification.

This invention relates to a semi-automatic selective control for computing heads useful in connection with machines such as the Underwood-Wright combined typewriting and computing machine, and is an improvement on an application No. 543,603, filed jointly by Gustave O. Degener and myself, February 12, 1910, and my application No. 671,741, filed January 17, 1912.

An object of this invention is to enable the rapid selection in a new and improved manner of any one of a plurality of combinations of states of which a plurality of computing heads are capable, by the simple manual adjustment of a single member.

In the embodiment used to illustrate the invention, a plurality of computing heads each have the driven element thereof governed in the rotation and direction of rotation so as to govern the activity and character of activity of the computing heads by a controlling mechanism individual to each head. The controlling mechanisms are in turn concomitantly manipulated by a governing mechanism which has shifters, one of which is individual to each controlling mechanism and capable of adjusting the same to any one of three positions corresponding to the three states of the accordant computing heads.

The shifters have a fixed relation to each other and are each in the form of a cylindrical cam having cam grooves with three distinct positioning points of different elevation corresponding to adding, subtracting or neutral positions of the controlling mechanisms. These three kinds of positioning points are repeated on each shifter the number of times required in different apposite permutations on the several shifters, to give the desired number of combinations of states of the computing heads. In the case of two computing heads, the distinct positioning points corresponding to adding and subtracting are repeated on each cam a number of times equal to the number of computing heads plus one. The positioning point corresponding to neutral is repeated on each cam a number of times equal to the number of computing heads. For example, in this case where two computing heads are shown, the positioning points corresponding to adding and subtracting are repeated three times on each cam, and the positioning point corresponding to neutral is repeated twice on each cam. This gives all possible combinations of states of the computing heads in the same and different orders, with the exception of the silencing of all of the computing heads, or in this example, of the double neutral, which can be obtained by cutting off the motor or by disconnecting the computing mechanism from the numeral keys of the typewriting mechanism.

The governing mechanism, of which the cams connected to move in unison form a part, is actuated from a controller which can occupy any one of a plurality of positions corresponding to the several combinations of states of the computing heads and is moved from one position to another by a single stroke. The controller has means for locking it in its several positions of adjustment, and also has means for indicating what combinations of states each position corresponds to. The governing mechanism including the cams and controller acts as a permutation device to determine the different states of the computing heads.

Other features and advantages will hereinafter appear.

In the accompanying drawings,

Figure 1 is a side view in elevation partly in section.

Fig. 2 is a fragmentary front view in elevation.

Fig. 3 is a diagrammatic skeleton view, showing the connection of one of the numeral keys to the valuating mechanism for determining the extent of rotation of the master wheels.

Fig. 4 is a vertical section through one of the computing heads.

Fig. 5 is a development of the two cam shifters, showing the relative arrangement of the positioning points for obtaining the several states of adding, subtracting and neutral of the computing heads.

Fig. 6 is a fragmentary horizontal section, showing a detail of the gearing for the tens carrying mechanism.

Referring more particularly to the separate parts of this invention as embodied in the form shown in the drawings, 1 indicates letter keys and 2 numeral keys which are secured to levers 3, so as to be capable of rocking, when depressed, bell cranks 4, to swing type bars 5 against the front side of a platen 6 mounted on a carriage 7, which in turn travels on one or more guides 8.

The carriage 7 may be fed step by step in the usual manner at the actuation of each of the keys, under the control of an escapement mechanism indicated in general at 9, which may be of the usual Underwood type. The movement of the traveling elements of the computing heads, of which two are shown at 10 and 11, may be controlled from the carriage in a manner described in my application No. 574,813, filed August 1, 1910.

The traveling elements of the computing heads 10 and 11, in this instance, are shown to be master wheels, one of which is disclosed at 12 in Fig. 4, and the means for traversing the same may be briefly described as including a rack bar 13 carried by the carriage 7 and movable therewith, which supports, at adjustable intervals, tappets or stops 14. The tappets 14, of which there may be one or more, engage at intervals with a spring-pressed latch 15 on one end of a lever 16, which is pivotally mounted intermediate its ends, as at 17. The opposite end of the lever 16 is bifurcated to form two forks 18, one of which extends to the master wheel of the computing head 10, and the other of which is connected to the master wheel of the computing head 11.

Inasmuch as the computing heads are the same, only one will be described. The master wheel 12 is mounted on a master wheel shaft 19, so as to rotate therewith and yet be capable of sliding longitudinally thereof, so as to bring the teeth thereon successively into engagement with internal gears 20 formed by inwardly projecting teeth on a series of computing wheels 21 which are arranged coaxially on the shaft 19. These computing wheels 21 are also provided with external teeth forming external gears 22, which mesh with corresponding gears 23 carrying numeral bearing dials or wheels 24 which are adapted to exhibit the numbers thereon, as they are turned up, through an aperture 25 in the computing head casing 26.

Each of the master wheel shafts 19 is provided at its outer extremity with a bevel gear from whence it receives its motion. These bevel gears are shown in Figs. 1 and 2, and are indicated by the numerals 27 and 28. The bevel gears 27 and 28 receive their motion in turn from either one of a pair of bevel gears loosely mounted on a shaft 29, and adapted to be connected thereto by clutches 30 and 31 splined on the shaft 29 and mounted between the members of loosely mounted pairs of gears so as to be capable of clutching either one in each pair to the shaft 29. The paired gears are indicated by the numbers 32, 33, 34 and 35.

In order that each of the computing wheels 21 will carry a complete rotation of a wheel of lower denomination to a partial rotation of a wheel of higher denomination, there is provided a tens carrying mechanism, indicated in general by the numeral 36, which is more fully described in said application No. 543,603. It is sufficient to say of the character of the tens carrying mechanism that it depends for its action on the rotation and direction of rotation of a rubber roller 37. This rubber roller 37, in the case of each computing head, is driven from a shaft 38 by means of a train of gearing, indicated in general by the numeral 39.

The shafts 38, in the case of the computing heads 10 and 11, are provided respectively with bevel gears 40 and 41 arranged to be driven in either direction by pairs of bevel gears loosely mounted on a shaft 42. These pairs of bevel gears are indicated by the numerals 43, 44, 45 and 46, and are adapted to be connected in driving relation with the shaft 42 by means of clutches 47 and 48 splined on the shaft 42, so as to be shiftable from a position in engagement with either one of the members of the pairs of gears to engagement with the other.

The clutches 30, 31 and 47 and 48 are likewise shiftable to an intermediate position corresponding to the interruption of the drive from the shafts 29 and 42 to the computing heads. The shaft 29 receives its drive from a shaft 49 by means of meshing bevel gears 50 and 51. The shaft 42 receives its drive from a shaft 52 through the intermediary of a shaft 53, which is connected to the shaft 42 at one end by means of bevel gears 54 and 55, and is connected to the shaft 52 at the other end by means of bevel gears 56 and 57. The shafts 49 and 52 receive their drive more or less directly from a motor 58 which is connected to the shaft 52 through the intermediary of a slip clutch (not shown) and intermeshing bevel gears 59 and 60. The shafts 49 and 52, however, are not permitted to rotate until one of the numeral keys has been struck, and then only an amount corresponding to the particular numeral key actuated. This arrangement is attained by providing the shafts 49 and 52 with bevel gears 61 and 62 meshing with a common bevel gear 63, which is connected by means of gears 64 and 65 to a shaft 66 on which a valuating or master wheel 67 is also secured.

The valuating wheel 67 is normally prevented from rotating by one of a series of pins 68 thereon engaging an escapement wheel 69, which in turn is prevented from rotation by an escapement wheel 70 secured to a common shaft 71, and engaging one of a pair of locking dogs 72 on a rock shaft 73. The rocking shaft 73 is oscillated at the depression of each of the numeral keys from "1" to "9" by means of a collar 74 which swings a lever 75, thereby in turn pulling on a lever 76 on the rock shaft 73 through the intermediary of a link 77. The collar 74 in turn is reciprocated at each stroke of a numeral key, as will be seen by reference to Fig. 3, by each of the keys 2 pulling down on a link 78, so as to rock a bell crank 79, and thus through the intermediary of a link 80, swing one of a series of levers 81 into engagement with the collar 74, whereby said collar will be pressed rearwardly against the tension of a spring 82 which returns it when the pressure on the key is removed.

The levers 81, in addition to shifting the collar 74, plunge jacks 83 against the corresponding ones of the pins 68 on the valuating wheel 67. The particular pin actuated will correspond to a key depressed, and will be located at a distance from the escapement wheel 69 corresponding to the value of the numeral key depressed. The selected pin will be thrust through the valuating wheel 67, so that it will in turn engage the escapement wheel 69 to prevent a further rotation of the valuating wheel 67 after a period of rotation, corresponding to the value of the depressed numeral key, has occurred.

The purpose of shifting the clutches 30 and 31 and 47 and 48 is to change the state of the computing heads by controlling the rotation of the actuable elements thereof and their direction of rotation. In order to shift these clutches to obtain the desired states under which the computing heads are to act at any particular instant, there are provided composite levers 84 and 85, one for each of the computing heads. These composite levers, together with the clutches, form a controlling mechanism individual to each computing head to govern the state thereof. In the form shown, each of these composite levers embodies a main lever 86 pivoted intermediate its ends at 87 and a supplementary lever 88 pivoted to the main lever at 89 by means of a pin or other device.

The supplementary lever 88 has a limited movement relative to the main lever, which may be taken up by a spring 90. The main and supplementary levers, in the case of each composite lever, are provided respectively with pins 91 and 92 which engage grooves in the master wheel clutch and tens carrying clutch, so that they will be shifted correspondingly in accordant directions to obtain corresponding rotations of the master wheel and tens carrying mechanism of each computing head. The main levers 86 project to the front of the machine where they are provided with finger pieces 93, whereby they may be manually adjusted.

In order to obtain a concomitant change in state of all of the computing heads, the composite levers 84 and 85 are provided with pins 94 and 95, whereby they may be adjusted to any one of their three positions corresponding to adding, substracting and neutral of their accordant computing heads by means of shifters 96 and 97 individual thereto, which form a part of a governing mechanism. The shifters 96 and 97 are shown in the form of cylindrical cams secured to a common shaft 98, so as to rotate in unison. To rotate the shaft 98, it is provided with a bevel gear 99 meshing with a bevel gear 100 which is secured to the same shaft as a gear 101.

The gear 101 may be rotated either forwardly or backwardly by means of a controller 103 which is shown to comprise a lever having a segment 102 engaging with the gear 101, the controller having its several positions of adjustment determined by means of a latch 104, which may be forced by a spring 106 into engagement with any one of a series of notches in a ratchet 105 secured to the lever 103. The several positions which the controller may occupy determine the combinations of states of which the computing heads are capable. These combinations of states may be indicated by the point of the lever 103 coming in opposition to designations arranged on a scale on a sector plate 107, the outer arc of designations referring to the lower computing head and the inner arc referring to the upper computing head.

It will be seen by referring to Fig. 5, which shows a development of the cams 96 and 97, that all possible combinations of states may be obtained with the exception of the double neutral, which may be obtained by cutting out the motor 58, or disconnecting the links 78 from the numeral keys 2. In the position in which the controller is shown in Fig. 2, the lever 103 points to "SS", which indicates that both the computing heads 10 and 11 will be subtracting. That is, the positioning points as shown at either the extreme right or left of Fig. 5, will be in engagement with the pins 94 and 95. This corresponds to the shifting of the composite levers 84 and 85 to their uppermost positions (considering the finger piece 93). These positions correspond to the subtracting state of both computing heads.

Each of the cams have two other distinct positioning points corresponding respectively to adding and neutral states of the computing heads. It will be seen by still referring to Fig. 5 that the adding and subtracting positioning points are repeated three times or a number of times equal to the number of computing heads plus "1", and that the positioning point corresponding to neutral is repeated in each cam twice or a number of times corresponding to the number of computing heads. This enables the attainment of every possible combination of states of the computing heads, with the exception of the silencing of all the computing heads or the double neutral, by the simple manipulation of the controller lever 103.

In the operation of the device, the controller 103 may be shifted as often as desired to obtain different states of the computing heads. It may even be shifted at each new column of writing on the work sheet on the platen. If we assume that in the first column on the work sheet on the platen it is desired to add in all the computing heads, the controller can be shifted so that its lever will be opposite to the second set of indicating letters in the scale, "AA". When this occurs, the segment gear 102 will rotate the gear 101 so as to rotate the shaft 98 through the intermediate gearing, whereby the positioning points, indicated at 110 and 111 in the development of the cams in Fig. 5, will come into engagement with the pins 94 and 95 of the controlling mechanism, whereby the clutches will be shifted to cause a rotation of the actuable elements of the computing heads in a direction corresponding to adding in both computing heads.

If, in the next column or any subsequent column, it is desired to change the character of action of either or both of the computing heads, the controller can be swung to the particular combination of actions which is desired. If, for example, it is desired to have the lower computing head adding and the upper computing head remain silent or inactive, the controller lever will be swung down to the third set of indicating characters "AN", when the positioning points, indicated at 112 and 113 in Fig. 5, will come into engagement with the pins 94, and thus adjust the controlling mechanism so that both the clutches 30 and 47 will be out of coöperation with both members of each pair of gears on the shafts 29 and 42, and also whereby the clutches 31 and 48 will be in their accordant positions corresponding to the adding action of the lower computing head.

It will thus be seen that the character of action of each and all of the computing heads can be controlled from a single point by the simple manipulation of a lever which moves in a single plane so as to obtain any combination of states of all the computing heads as may be desired, and that the change from one combination of states to another may be made as often as desired.

Variations may be resorted to within the scope of the invention, and portions of the improvements may be used without others.

Having thus described my invention, I claim:

1. The combination with a plurality of computing heads, of individual controlling mechanism for governing the state of each computing head, governing mechanism for adjusting all of said controlling mechanisms, a bevel gear connected to said governing mechanism, a bevel gear meshing with said first mentioned bevel gear, a gear for driving said second-mentioned bevel gear, and a lever having a gear connected thereto and meshing with said last-mentioned gear for actuating said governing mechanism.

2. In a combined typewriting and computing machine, the combination with a traveling carriage to determine different computing zones or columns and a plurality of computing heads, each capable of existing in addition, subtraction or in neutral state, of a permutation device to control the states of said computing heads, said permutation device having a state controller, one for each computing head, said controllers bearing formations such that said controllers may act jointly to determine any state of activity of any head in combination with any of said states of any other head.

3. In a computing machine, the combination with a plurality of computing heads, each capable of existing in addition, subtraction or a neutral state, of a permutation device to control the states of said computing heads, said permutation device having a state controller for each computing head, and said permutation device including a part shiftable by a single stroke from one position to any other, to determine any state of activity of any head in combination with any of said states of any other head.

4. In a computing machine, the combination with computing mechanism including a plurality of computing heads adapted to exist in different states as to addition, subtraction or remaining neutral, of a member movable to different positions by a single stroke and determining by its position any state of activity of any head in combination with any of said states of any other head.

5. The combination with a plurality of computing heads having certain actuable parts, of means for driving said parts, gearing between said driving means and said parts, means for controlling the rotation and direction of rotation of said parts by said gearing, and a single lever movable solely in one plane for actuating said controlling means to selectively determine any combination of states which said computing heads shall act under at any particular moment.

6. In a combined typewriting and computing machine, the combination with a traveling carriage to determine different computing zones or columns and a plurality of computing heads, each capable of existing in addition, subtraction or a neutral state, of state controlling mechanism individual to each head, cams, each of said cams having positioning points corresponding with adding, subtracting and neutral states of said computing heads, the positioning points corresponding to each state being repeated on each cam the same number of times, whereby said cams may by a movement from one position to another selectively determine any state of activity of any head in combination with any of said states of any other head in any computing zone as determined by said carriage.

7. In a combined typewriting and computing machine, the combination with a traveling carriage to determine different computing zones or columns and a plurality of computing heads, each capable of existing in addition, subtraction or a neutral state, of state controlling mechanism individual to each head, cams having positioning points, the positioning points on one cam being different in order of arrangement to the positioning points on the other cam, said positioning points on the two cams bearing such relation to each other that said cams may act jointly to determine any state of activity of any head in combination with any of said states of any other computing head in any computing zone as determined by said carriage.

8. In a combined typewriting and computing machine, the combination with a traveling carriage to determine different computing zones or columns and a plurality of computing heads, each capable of existing in addition, subtraction or a neutral state, of state controlling mechanism individual to each head, cams, each of said cams having three positioning points corresponding with adding, subtracting and neutral states of the computing heads, the positioning points of the same kind on each of said cams being in register with each other and also in register with every other kind, whereby said cams may act jointly to determine different combinations of state of said computing heads in any computing zone as determined by said carriage.

9. The combination with a plurality of computing heads, of controlling mechanism for governing the state of each of said computing heads, a cam for each of said controlling mechanisms, each of said cams having three distinct positioning points corresponding to the adjustment of said controlling mechanisms accordant with adding, subtracting and neutral states of the connected computing heads, the positioning points corresponding to each state being repeated on each cam the same number of times, a shaft connecting said cams to move in unison, and a single controller for rotating said shaft in either direction, and determining by its position the different combinations of states accordant with said positioning points.

10. In a computing machine, the combination with computing mechanism including a plurality of computing heads adapted to exist in different states as to addition, subtraction or remaining neutral, of a plurality of members, one member for each computing head, each of said members having positioning points in number and arrangement such that said members may act jointly to determine any state of activity of any head in combination with any of said states of any other head and a member movable from one position to a plurality of other positions to determine said combinations of states.

11. The combination with a plurality of computing heads, of a typewriter carriage traveling to determine different computing zones or columns, and controlling mechanism independent of the travel of said carriage for selectively obtaining any combinations of states of said computing heads, said controlling mechanism including a member occupying various positions and movable by a single stroke from one position to any other and determining by its positions the states of said computing heads in any computing zone as determined by said carriage.

12. The combination with a typewriting mechanism including a traveling carriage, of computing mechanism including a plurality of computing heads, and controlling mechanism for selectively obtaining any combinations of states of said computing heads for any position of said carriage, said controlling mechanism including a controlling lever movable in a single plane from one position to any other and determining by its positions the various combinations of states of said computing heads in any computing zone as determined by said carriage.

13. In a computing machine, the combination with computing mechanism including a plurality of computing heads adapted to exist in different states, of a permutation device to control the states of said computing heads including a plurality of circular cam tracks one for each computing head, said cam tracks having formations arranged according to a definite plan and rotatable in unison to different positions and controlling by their positions different combinations of states of said computing heads.

14. The combination with a plurality of computing heads, of a shifter for each of said computing heads, operable to determine the states of said computing heads, a shaft common to all of said shifters arranged to operate said shifters in unison, and a controller lever connected to rotate said shaft and said shifters, said controller lever moving solely in a plane parallel to the axis of said shaft.

15. The combination with a plurality of computing heads, of a plurality of shifters, one for each of said heads connected to control the states of said heads, a shaft common to all of said shifters and extending vertically alongside of said computing heads, and a controller lever connected to rotate said shaft so as to operate said shifters in unison, said controller lever moving solely in a single vertical plane.

16. In a computing machine, the combination with computing mechanism including a plurality of computing heads adapted to exist in different states, of a plurality of cam members one member for each computing head, and a lever movable in a single plane to cause joint action of said members and thereby determine any state of activity of any head in combination with any state of any other head.

17. The combination with a plurality of computing units for computing in a given cycle of computing zones, of a joint control common to all of said computing units and manipulable from a single point, said joint control having provision for determining any state of activity of any head in combination with any state of any other head which combinations may be obtained by a single stroke of said joint control from one position to any other, said joint control being effective at any point in the cycle of computing zones.

WALTER WRIGHT.

Witnesses:
 B. GOLDBERG,
 C. RIPLEY.

Copies of this patent may be obtained for five cents each, by addressing the "Commissioner of Patents, Washington, D. C."